(12) United States Patent
Maneval et al.

(10) Patent No.: US 11,016,478 B2
(45) Date of Patent: May 25, 2021

(54) METHOD FOR THE APPLICATION-SPECIFIC SETTING OF A FIELD DEVICE

(71) Applicant: Endress+Hauser Process Solutions AG, Reinach (CH)

(72) Inventors: Michael Maneval, Schopfheim (DE); Nikolai Fink, Aesch (CH); Hans Joachim Fröhlich, Arlesheim (CH); Thomas Schmidt, Basel (CH)

(73) Assignee: Endress+Hauser Process Solutions AG, Reinach (CH)

( * ) Notice: Subject to any disclaimer, the term of this patent is extended or adjusted under 35 U.S.C. 154(b) by 211 days.

(21) Appl. No.: 16/468,368

(22) PCT Filed: Oct. 30, 2017

(86) PCT No.: PCT/EP2017/077756
§ 371 (c)(1),
(2) Date: Jun. 11, 2019

(87) PCT Pub. No.: WO2018/108376
PCT Pub. Date: Jun. 21, 2018

(65) Prior Publication Data
US 2020/0401123 A1 Dec. 24, 2020

(30) Foreign Application Priority Data
Dec. 13, 2016 (DE) ...................... 10 2016 124 162.8

(51) Int. Cl.
*G05B 23/02* (2006.01)
*G05B 19/042* (2006.01)

(52) U.S. Cl.
CPC ..... *G05B 23/0272* (2013.01); *G05B 19/0425* (2013.01)

(58) Field of Classification Search
None
See application file for complete search history.

(56) References Cited

U.S. PATENT DOCUMENTS

2009/0112335 A1* 4/2009 Mehta ................... G05B 17/02
700/29

FOREIGN PATENT DOCUMENTS

DE 102007026244 A1 12/2008
DE 102008043094 A1 4/2010
(Continued)

*Primary Examiner* — Carlos R Ortiz Rodriguez
(74) *Attorney, Agent, or Firm* — Mark A. Logan; Endress+Hauser (USA) Holding Inc.

(57) ABSTRACT

The present disclosure relates to a method for the application-specific setting of a field device, which is installed in a defined application in a process in automation engineering and determines or monitors at least one process variable of a medium, comprising: recording a diagnostic message which occurs or has occurred on the field device during a defined interval, analyzing which of the diagnostic messages are tolerable and/or plausible in the defined application, assigning an application-specific notice with regard to tolerability and/or plausibility to each diagnostic message that has arisen in the defined application, clearing the diagnostic message if this is classified as tolerable and/or plausible in the defined application, and using the application-specific setting of the field device, which clears the diagnostic message classified as tolerable and/or plausible.

9 Claims, 1 Drawing Sheet

(56) References Cited

FOREIGN PATENT DOCUMENTS

| DE | 102010044184 A1 | 5/2012 |
|----|-----------------|--------|
| DE | 102014103185 A1 | 9/2014 |
| DE | 102013111052 A1 | 4/2015 |

* cited by examiner

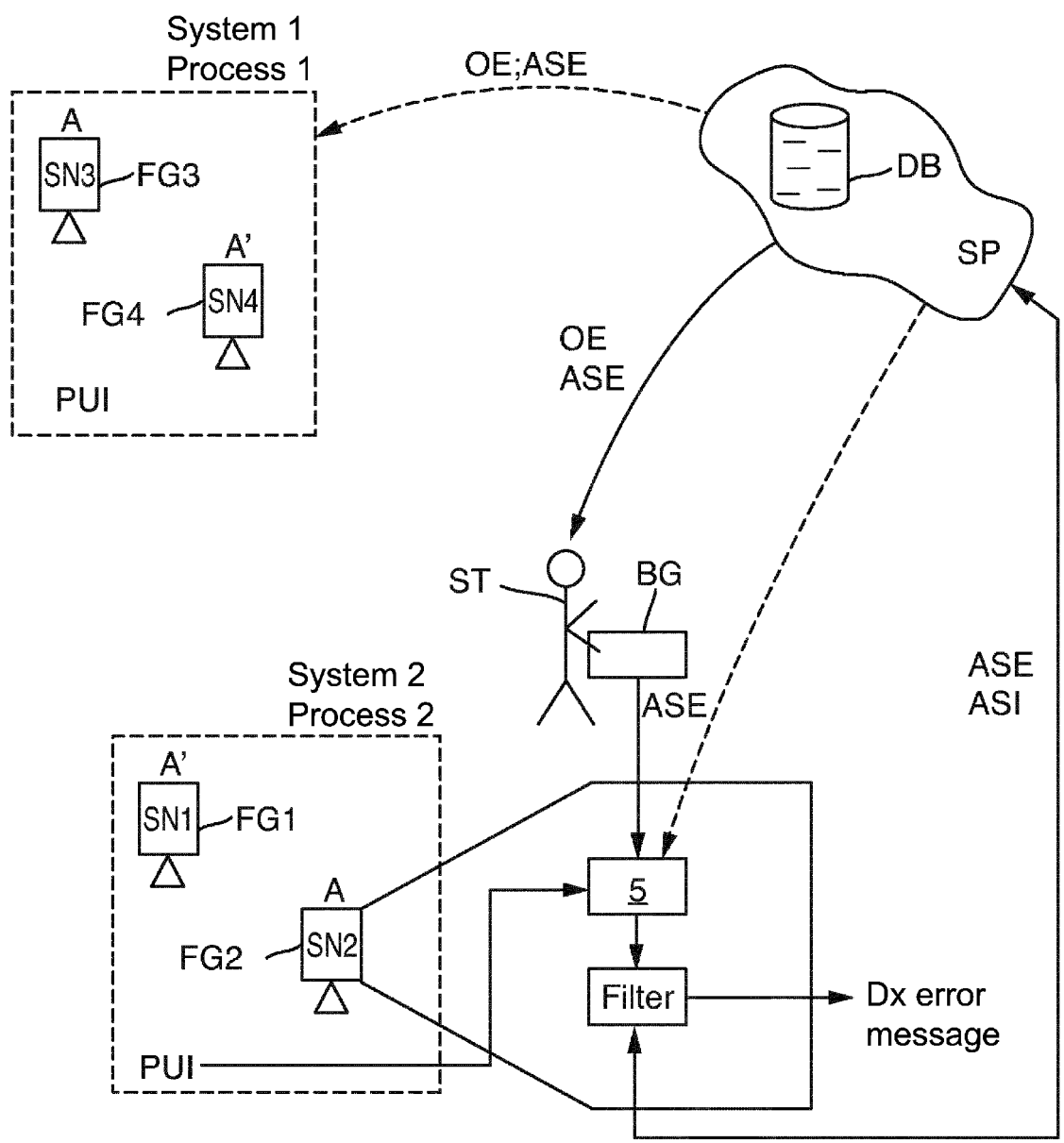

METHOD FOR THE APPLICATION-SPECIFIC SETTING OF A FIELD DEVICE

CROSS-REFERENCE TO RELATED APPLICATIONS

The present application is related to and claims the priority benefit of German Patent Application No. 10 2016 124 162.8, filed on Dec. 13, 2016 and International Patent Application No. PCT/EP2017/077756 filed on Oct. 30, 2017, the entire contents of which are incorporated herein by reference.

TECHNICAL FIELD

The invention concerns a method for the application-specific setting of at least one field device, which is installed in a defined application in a process in automation engineering and determines or monitors at least one process variable of a medium.

BACKGROUND

In automation systems, especially in process automation systems, field devices are often used to determine and/or influence process variables. To determine process variables, sensors are used which are, for example, integrated in filling level meters, flow meters, pressure and temperature meters, pH redox potential meters, conductivity meters, etc. which record the corresponding process variables of filling level, flow, pressure, temperature, pH value or conductivity. Actuators, such as, for example, valves or pumps, are used to influence process variables. The flow rate of a fluid in a pipeline section or a filling level in a container can thus be altered by means of actuators. Field devices, in general, refer to all devices which are process-oriented and which supply or process process-relevant information. In connection with the invention, field devices are also understood to be remote I/Os, radio adapters and general devices that are arranged at the field level. A variety of such field devices are manufactured and marketed by the Endress+Hauser company.

In many cases, a field device is connected to an evaluation/control unit via a two-wire line. The two-wire line is used to supply power to the field device and for communication with the evaluation/control unit, usually via the HART protocol. In modern industrial plants, field devices are often integrated into communication networks. Communication between at least one higher-level control unit and the field devices usually takes place via a bus system. The fieldbus protocols used primarily in automation technology, such as Profibus®, Foundation Fieldbus® or HART®, are employed. Communication can be configured to be both wired and wireless. The higher-level control unit is used for process control, process visualization, process monitoring, along with the commissioning and operation of the field devices, and is also referred to as a configuration/management system.

Field devices are also increasingly being equipped with Internet interfaces for communication and/or power supply. In addition to network accesses such as Ethernet, such field devices are preferably also operated via a mobile operating tool which establishes a connection with the field device when required. Wireless HART or Bluetooth, for example, is employed as the communication protocol between the control unit and the field devices.

A field device that determines or monitors at least one defined process variable can be used in different applications. For example, a field device for filling level measurement can work in different processes, wherein the process and/or environmental conditions can vary considerably in the processes. For example, the medium can be a solid, a liquid or a gas. If it is a liquid, it may have a tendency to form foam. It may be alkaline or acidic. An agitator for mixing the medium can be provided. Other important process conditions at the measuring point are, of course, temperature, pressure, humidity, etc. Depending on the respective use or application in which the field device is employed, such influencing variables mentioned as examples can—as already mentioned—deviate considerably from each other.

Modern field devices are preferably monitored online—that is, while performing their determination and/or monitoring task—but also offline, at least at specified time intervals, with regard to their proper functioning. For this purpose, field devices are equipped with monitoring functions that enable them to perform self-diagnoses in the field device or diagnoses of the field device in interaction with the process and/or the medium. The monitoring functions refer to both the mechanical integrity and the proper electrical or electronic functioning of the field device. Furthermore, whether everything is in order at the measuring point—this describes the field device in interaction with the process—or whether irregularities occur is monitored. An irregularity would be, for example, if the process and/or environmental conditions are outside the maximum allowable values for which the field device is designed according to specifications.

Based on the monitoring measures, an error message is generated every time an irregularity and/or a diagnostic function or malfunction—that is, a deviation from a specification—is detected. Depending on the type of diagnostic or error message, this can trigger a stop of the automation system. Under certain circumstances, a failure of a field device and/or a system stop can result in considerable expenses. However, it is often the case that a diagnostic and/or error message generated by the field device or the higher-level control unit is perfectly acceptable in the defined application in which the field device operates. In order to be able to evaluate and make a decision on this, in addition to information regarding the functioning of the field device, detailed information regarding the process itself is necessary.

Let us consider two examples of cases that occur in process automation:

With a Coriolis flow meter, a false alarm is triggered when the so-called "zero point fluctuation" occurs. This is the result of a pulsating flow. However, the zero point fluctuation depends on the pump used in the process or application. The alarm threshold must be set depending on the pump type used so that a false alarm is not triggered if any zero point fluctuation is detected. This setting is carried out by a specialized service technician who is highly familiar with the process and the devices or field devices employed.

A vibronic level switch is installed as overfill protection in a vessel. As soon as the vibronic level switch detects that the maximum filling level of the medium in the vessel has been reached, a corresponding message is generated. The vibronic sensor has a diagnostic function of "Attention: foam". The corresponding diagnostic/error message is generated as soon as the foam is in contact with, for example, the vibrating fork of the vibronic sensor up to a defined immersion depth. The service technician responsible for the measuring point has the special knowledge that the medium is foaming strongly in the process, but that the diagnostic message of "Attention: foam" is not critical in this application.

Thus, today, assessing whether a diagnostic/error message from a field device is critical in the case of the respective application or whether it can be tolerated in the respective application is the exclusive responsibility of a specialized service technician. If the diagnostic/error message is not critical in the opinion of the service technician, this can usually be remedied by setting the field device or the higher-level controller such that the diagnostic/error message is suppressed in the event of the formation of foam and is no longer generated.

Thus, the knowledge and the experiences gained concerning a process are always subjective and bound to individual persons. Problems occur at the latest when the field device is subsequently used in another application, when the zero point fluctuation or foam formation is critical and the service technician who had deactivated the function does not carry out a new installation or forgot to deactivate it. The same applies if the old field device is replaced by a new one, which in turn generates the previously suppressed diagnostic/error message. To name another disadvantage of the known solution, changes to the field device or to the higher-level control unit are time-consuming and therefore costly.

SUMMARY

The invention is based on the object of optimally adapting the settings of the field device to the respective application in which it is installed.

The object is achieved by a method for the application-specific setting of at least one field device that is installed in a defined application in an automation technology process and determines or monitors at least one process variable of a medium. The method according to the invention has in particular the following method steps:
- recording at least one diagnostic message, error message or notice about an error message, which occurs or has occurred at least temporarily in the field device at least during a defined interval,
- analyzing which of the diagnostic messages, error messages and/or notices about the error messages are tolerable and/or plausible in the defined application— this is preferably done on the basis of empirical values,
- assigning an application-specific notice with regard to tolerability and/or plausibility to each diagnostic message, error message and/or notice about an error message that has arisen in the defined application,
- suppressing the at least one diagnostic message, error message and/or notice about an error message, if this is classified as tolerable and/or plausible in the defined application,
- carrying out the application-specific setting of the field device, which remedies the at least one diagnostic message, error message and/or notice classified as tolerable and/or plausible.

Usually, the notice about the application-specific settings of field devices comes from external sources and is provided, for example, by service technicians who have made the application-specific settings in other systems. Such application-specific settings are subsequently made available to all other field devices installed in comparable applications—with the result that the corresponding diagnostic message, error message or notice about an error message or the underlying event is subsequently ignored. The diagnostic message, error message or notice about an error message or the underlying event has been filtered out retrospectively as it were and is no longer generated and/or displayed in the alarm management, for example of the higher-level control unit or the control system.

The advantages of the method according to the invention are in particular the following:
- Subsequent setting changes in the higher-level control unit are avoided.
- Application-specific expert knowledge, which accumulates in particular during the engineering or ordering phase and which is recorded in online systems, such as cloud services, can subsequently also be used at similar measuring points—beyond the boundaries of an automation system or an operation.
- Time and cost savings.
- Reduced error susceptibility when interpreting diagnostic or error events.
- Reduction of the alarm flood—and thus a rapid and unambiguous recognition of the diagnostic and/or error messages that are actually critical for the present application.

An advantageous design of the method according to the invention provides that the application-specific setting of the field device that remedies the at least one tolerable or plausible diagnostic message, error message and/or notice about an error message is stored in the field device. This facilitates the adoption of the optimal setting information upon replacing a device when the original field device is replaced with a new one.

Alternatively, it is proposed that the application-specific setting of the field device, which suppresses the at least one tolerable and/or plausible diagnostic message, error message and/or notice about an error message, is stored in an operating device for operating the field device. Alternatively and/or in combination, it is provided that the application-specific setting of the field device, which remedies the at least one tolerable and/or plausible diagnostic message, error message and/or notice about an error message, is transmitted to a cloud-based service platform.

In addition, an advantageous design of the method according to the invention provides that the application-specific settings of a large number of field devices are stored in the same or a similar defined application, that is, in comparable applications. The stored application-specific settings of the field devices are used to determine an optimum setting for a field device in the same or a similar application. Furthermore, it is provided that the optimum setting for field devices in the same or similar application is preferably provided via the service platform.

An advantageous development of the method according to the invention provides that the optimal setting for field devices in the same or a similar application is determined by statistical evaluation methods.

Preferably, the optimal setting for field devices in the same or a similar application is carried out during a commissioning of the field device, during a service measure or during the operation of the field device for the purpose of optimally adapting to the application. In the simplest case, the optimum setting is determined from the available data by averaging.

The optimum setting for field devices in the same or similar application is preferably transmitted directly from the service platform to the field device. It is also possible to transfer the setting to the field device via an intermediate operating tool (mobile phone, laptop, pad, special tool, etc.). This has the advantage that not every field device has to be connectable to the Internet. The transmission can be wireless or wired. The application-specific change in the diagnostic filter of the field device can be set, for example, via an operating software program, for example FieldCare by the Endress+Hauser group, a DTM (device type manager) or a DD (device description).

It is also provided that a permanent online connection (FDT network topology with nested communication) will be used for broadband distribution of the settings to all field devices installed in comparable applications.

BRIEF DESCRIPTION OF THE DRAWING

The invention is explained in more detail using the following FIG. 1. FIG. 1 schematically shows an arrangement used to carry out the method according to the invention for the application-specific setting ASE of a field device FG. For example, the application-specific setting ASE is carried out during or after commissioning or as part of maintenance. Two field devices FG1, FG2; FG3, FG4, each of which are installed in defined applications A; A' in a process process 1; process 2 in systems system 1; system 2 of automation technology, are shown as examples. In the case shown, the field devices FG1, FG2, FG3, FG4 with the corresponding serial numbers SN1, SN2, SN3, SN4 monitor the filling level of a medium in a vessel. The vessel and the medium are not shown. It is self-evident that the filling level is only mentioned as an example as a process variable to be determined or monitored. In the introduction to the description, additional process variables to be determined or monitored are mentioned—also by way of example.

DETAILED DESCRIPTION

The method according to the invention is indicated on the field device FG2 by the serial number SN2. Diagnostic messages, error messages or notices about an error message D that occur in the field device FG2 are recorded in the memory S, for example. Typically, this recording is undertaken over a defined time interval. This time interval can be a few seconds, minutes or hours, or the length of time between two standard service examinations to be performed. During the time interval, the diagnostic messages, error messages and/or notices about the error messages D may occur continuously or only temporarily.

The field device FG2 with the serial number SN2 is used in a defined application A. The application A is characterized by predefined or measured application-specific process and environmental information ASI. The application-specific process and environmental information ASI is preferably collected during the engineering phase and/or the ordering phase of the field device FG2, but can also be added at a later point in time during the operation of the field device FG2 or during maintenance of the field device FG2. The environmental information PUI comprises in particular the temperature, pressure, humidity, etc. These are either measured or specified in the process process 1. The process information relates in particular to the properties of the medium to be determined or monitored, or the vessel in which the medium is located. Such information is supplied, for example, by the service technician ST.

In the following, which diagnostic message(s), error message(s) and/or notices about the error message(s) D is/are tolerable and/or plausible in the defined application A is preferably analyzed on the basis of all available application-specific information ASI. Thus, every diagnostic message, error message and/or notice about the error message D of the application A is provided with expert knowledge. The expert knowledge or the application-specific information ASI comes either from the service technician ST, or it is made available from a database DB, for example the service platform SP. Such application-specific information ASI is assigned to each diagnostic message, error message and/or notice about the error message D of the field device FG. This indicates whether a diagnostic message, error message and/or notices about the error message D can be tolerated in the defined application A, or whether it comprises an error message Dx that must result in maintenance measures. Each diagnostic message, error message and/or notice about an error message D that is classified as tolerable and/or plausible in the defined application A is subsequently cleared or filtered out in the application-specific setting ASE of the field device FG. The field device FG is then operated with the application-specific setting ASE, which clears at least one diagnostic message, error message and/or help notice D classified as tolerable and/or plausible. A time-consuming change in the error management of the higher-level control unit or the control room is not necessary.

The application-specific setting ASE of the field device FG is stored in the field device FG2 or in the operating device BG. Examples of the design of the operating device BG have been described above. If the field device FG is part of a communication network, the application-specific setting ASE of the field device FG can also be stored in an additional participant of the communication network, be it, for example, a field device, a gateway or a radio adapter.

Alternatively or in addition, the application-specific setting ASE, which clears the plausible and/or tolerable diagnostic message, error message and/or notice about an error message D, is transmitted to a cloud-based service platform SP. The advantage of the latter variant can be seen in the fact that the application-specific setting ASE is now also available at any time and anywhere for field devices FG that are installed in other systems—here, system 1—with the same or comparable applications A, A'.

The cloud-based solution also has the advantage that, at a defined location (centralized or decentralized), application-specific settings ASE of a large number of field devices FG are available in the same or a similar defined application A, A'. Using the stored application-specific settings ASE of the field devices FG, an optimal setting OE for field device FG can be determined in the same or similar application A, A'. Similar application A' means an application that corresponds to a defined application A within specified tolerance limits with regard to the individual application-specific information ASI.

The optimum setting of for field devices FG in the same or similar defined application A, A' is preferably determined via statistical evaluation methods. This allows the tolerance limits of the application-specific information ASI or the application-specific settings ASE to be minimized and continuously improved, since subsequently configured field devices FG can be configured with continuously improving application-specific settings ASE due to the growing availability of application-specific information ASI.

The invention claimed is:

1. A method for the application-specific setting of a field device which is installed in a defined application in a process in automation engineering and determines or monitors at least one process variable of a medium, comprising:
    recording a diagnostic message, error message, or notice about an error message which occurs or has occurred at least temporarily on the field device during a defined interval;

analyzing if the diagnostic message, error message, and/or notice about an error message is tolerable and/or plausible in the defined application;

assigning an application-specific notice with regard to tolerability and/or the plausibility to the diagnostic message, error message, and/or notice about an error message that has arisen in the defined application;

clearing the diagnostic message, error message, and/or notice about an error message if the diagnostic message, error message, and/or notice about an error message is classified as tolerable and/or plausible in the defined application; and using an application-specific setting of the field device, which clears the diagnostic message, error message, and/or notice about an error message classified as tolerable and/or plausible.

2. The method according to claim 1, wherein the application-specific setting of the field device, which clears the tolerable or plausible diagnostic message, error message, and/or notice about an error message, is stored in the field device.

3. The Method according to claim 1, wherein the application-specific setting of the field device, which clears the tolerable or plausible diagnostic message, error message, and/or notice about an error message, is stored in an operating device for operating the field device.

4. The method according to claim 1, further comprising:
transmitting to a to a cloud-based service platform the application-specific setting of the field device, which clears the tolerable or plausible diagnostic message, error message, and/or notice about an error message.

5. The method according to claim 4, wherein application-specific settings are stored by a large number of field devices in the same or a similar defined application, and
wherein an optimum setting for a field device in the same or a similar application is determined using the stored application-specific settings of the field devices.

6. The method according to claim 5, wherein the optimum setting for field devices in the same or similar defined application is provided via the cloud-based service platform.

7. The method according to claim 5, wherein the optimum setting for field devices in the same or the similar defined application is determined using statistical evaluation methods.

8. The method according to claim 5, wherein the optimal setting for field devices in the same or similar defined application is carried out during the commissioning of the field device, during a service measure or during the operation of the field device for the purpose of the optimal adaptation to the defined application.

9. The method according to claim 5, further comprising:
transmitting from the cloud-based service platform directly to the field device the optimal setting for field devices in the same or the similar defined application.

* * * * *